(12) United States Patent
Mizuno et al.

(10) Patent No.: US 6,479,114 B2
(45) Date of Patent: *Nov. 12, 2002

(54) STEERING WHEEL WITH AIR BAG

(75) Inventors: Hisashi Mizuno, Ichinomiya (JP);
Satoru Ono, Yoro-gun (JP); Takahiro Yamada, Nagoya (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,610

(22) Filed: Oct. 28, 1998

(65) Prior Publication Data

US 2001/0024705 A1 Sep. 27, 2001

(30) Foreign Application Priority Data

Oct. 28, 1997 (JP) ................................. 9-312690

(51) Int. Cl.[7] ..................... B29D 22/00; B32B 27/00; C08G 18/10; B60R 21/16
(52) U.S. Cl. ..................... 428/35.7; 428/423.1; 528/53; 528/59; 280/728.1; 280/731
(58) Field of Search ................. 74/552; 280/728.1, 280/731, 732, 728.3; 428/423.1, 39.2, 35.5, 160, 35.7; 528/52, 53, 59, 472, 494, 495

(56) References Cited

U.S. PATENT DOCUMENTS

| | | | |
|---|---|---|---|
| 3,577,358 A | * 5/1971 | Santelli et al. | 260/2.5 |
| 3,919,279 A | * 11/1975 | Rosenthal et al. | 260/453 P |
| 3,962,302 A | * 6/1976 | Roenthal et al. | 260/453 P |
| 4,731,427 A | * 3/1988 | Younes | 528/53 |
| 5,002,306 A | * 3/1991 | Hiramitsu et al. | 280/731 |
| 5,367,045 A | * 11/1994 | Takimoto et al. | 528/53 |
| 5,633,289 A | * 5/1997 | Nakamura et al. | 521/51 |
| 5,945,185 A | * 8/1999 | Hirai et al. | 428/35.2 |
| 5,945,206 A | * 8/1999 | Jogan et al. | 428/215 |

* cited by examiner

Primary Examiner—Harold Pyon
Assistant Examiner—Michael C. Miggins
(74) Attorney, Agent, or Firm—Pillsbury Winthrop LLP

(57) ABSTRACT

A steering wheel with an air bag comprising a pad with said air bag, at least one spoke and a ring, which are integrally formed of a polyurethane, is disclosed. The polyurethane has 50 to 70 of Shore A type hardness (at a temperature of 25° C.) and 150% or more of elongation at break (at a temperature of 25° C.).

8 Claims, 4 Drawing Sheets

STEERING WHEEL WITH AIR BAG

BACKGROUND OF THE INVENTION

1. Field of the Invention

This invention relates to a steering wheel with an air bag, which has a polyurethane.

2. Description of the Related Art

Moderate hardness and resilience, and excellent wear resistance are required of a polyurethane (polyurethane covering for a metal core) formed for a ring of a steering wheel. On the other hand, high elongation at break is required of a polyurethane formed for a pad of a steering wheel with an air bag so as to prevent the polyurethane from fragmenting into small pieces and dispersing when the air bag inflates or expands. It is difficult, however, to find a balance point in one polyurethane material (material used for molding a polyurethane), which satisfies every these required performances, i.e., "moderate hardness and resilience", "excellent wear resistance" and "high elongation at break". Actually, such a balance point has not been found up to now. It is because the realization of "moderate hardness and resilience" and "excellent wear resistance" requires heightening the crosslinking density, which lowers the elongation.

Therefore, according to a conventional steering wheel with an air bag, a polyurethane for a ring and spokes and a polyurethane for a pad with an air bag were molded separately as separate units. And they were molded from a polyurethane material suitable for each performance and different from each other, respectively.

Because of this separate molding, the conventional steering wheel with an air bag had a problem that the number of molding equipments and molding steps were increased.

SUMMARY OF THE INVENTION

It is, therefore, an object of this invention to provide a steering wheel with an air bag, which makes it possible to decrease the number of molding equipments and molding steps, by integrally forming a polyurethane for a pad with an air bag, at least one spoke and a ring, which can attain a good balance among performances, i.e., "moderate hardness and resilience", "high elongation at break", and more preferably, "excellent wear resistance" so as these performances to be satisfactorily met.

To solve the above-described problem, the following measures (1) to (6) were taken.

(1) A pad with an air bag, at least one spoke and a ring were integrally formed of a polyurethane, which had 50 to 70 of Shore A type hardness (at a temperature of 25° C.) and 150% or more of elongation at break (at a temperature of 25° C.).

(2) A pad with an air bag, at least one spoke and a ring were integrally formed of a polyurethane, which had 50 to 70 of Shore A type hardness (at a temperature of 25° C.), 150% or more of elongation at break (at a temperature of 25° C.) and class 4 or more (class 4 or class 5) of wear resistance (evaluation of classes will be described later).

(3) A pad with an air bag, at least one spoke and a ring were integrally formed of a polyurethane, which was molded from a polyurethane material comprising a diphenylmethane diisocyanate (MDI) prepolymer and a polyol component, said MDI prepolymer being denaturated with a long chain glycol having an average molecular weight of 2000 or more. The reason why the MDI prepolymer is denaturated with a long chain glycol having an average molecular weight of 2000 or more, in other words, the reason why the MDI prepolymer is synthesized by reaction of a long chain glycol having an average molecular weight of 2000 or more and MDI, is to attain good balance between hardness and resilience, and elongation at break without ruining straightness of the isocyanate. The polyol component is not limited to a specific one, and a polyether polyol or a polymer polyol is preferably used.

(4) A pad with an air bag, at least one spoke and a ring were integrally formed of a polyurethane, which was molded from a polyurethane material comprising an MDI prepolymer and a polyol component, said MDI prepolymer being a mixture of a prepolymer having two benzene nucleuses and a prepolymer having three benzene nucleuses with the ratio of the prepolymer having three benzene nucleuses to the total being 7% by weight or less. The reason why the ratio of the prepolymer having three benzene nucleuses is restricted to 7% by weight or less is to attain a good balance between hardness and resilience, and elongation at break without ruining the straightness of the isocyanate. The polyol component is not limited to a specific one, and a polyether polyol or a polymer polyol is preferably used.

(5) A pad with an air bag, at least one spoke and a ring were integrally formed of a polyurethane, which was molded from a polyurethane material comprising an MDI prepolymer and a polyether polyol, said MDI prepolymer being denaturated with a long chain glycol having an average molecular weight of 2000 or more, and said polyether polyol containing one selected from a group consisting of 15 to 30 parts by weight of diethylene glycol, 11 to 20 parts by weight of ethylene glycol and 12 to 25 parts by weight of 1,4-butanediol for 100 parts by weight of polyether polyol. The reason why the above-described amount of diethylene glycol, ethylene glycol or 1,4-butanediol is added to the polyether polyol is that such an increased amount of these chain extenders more than the conventional and general amount (10 to 20 parts by weight for diethylene glycol, 5 to 10 parts by weight for ethylene glycol and 7 to 15 parts by weight for 1,4-butanediol, approximately) heightens the wear resistance. More preferably, 20 to 30 parts by weight of diethylene glycol or 15 to 20 parts by weight of 1,4-butanediol is added.

(6) A pad with an air bag, at least one spoke and a ring were integrally formed of a polyurethane, which was molded from a polyurethane material comprising an MDI prepolymer and a polyether polyol, said MDI prepolymer being a mixture of a prepolymer having two benzene nucleuses and a prepolymer having three benzene nucleuses with the ratio of the prepolymer having three benzene nucleuses to the total being 7% by weight or less, and said polyether polyol containing one selected from a group consisting of 15 to 30 parts by weight of diethylene glycol, 11 to 20 parts by weight of ethylene glycol and 12 to 25 parts by weight of 1,4-butanediol for 100 parts by weight of polyether polyol. See the measure (5) as to the added amount of the chain extenders.

Examples of a material used for molding the polyurethane in the measure (1) are polyurethane materials used in the measures (3) or (4). Examples of a material used for molding the polyurethane in the measure (2) are polyurethane materials used in the measures (5) or (6).

A mold release agent may be added to the polyether polyol or as a third component. It is also possible to add a coloring agent to the MDI prepolymer or the polyether polyol, or as a third component.

It is preferable that the polyurethane be an integral skin foam comprising an self-skin layer and a foamed core region. Examples of such a polyurethane are a polyurethane molded by injecting said polyurethane material into a mold cavity under reduced pressure to be foamed, or a polyurethane molded by injecting said polyurethane material and a foaming agent into a mold cavity under normal pressure to be foamed.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

Figure 1:
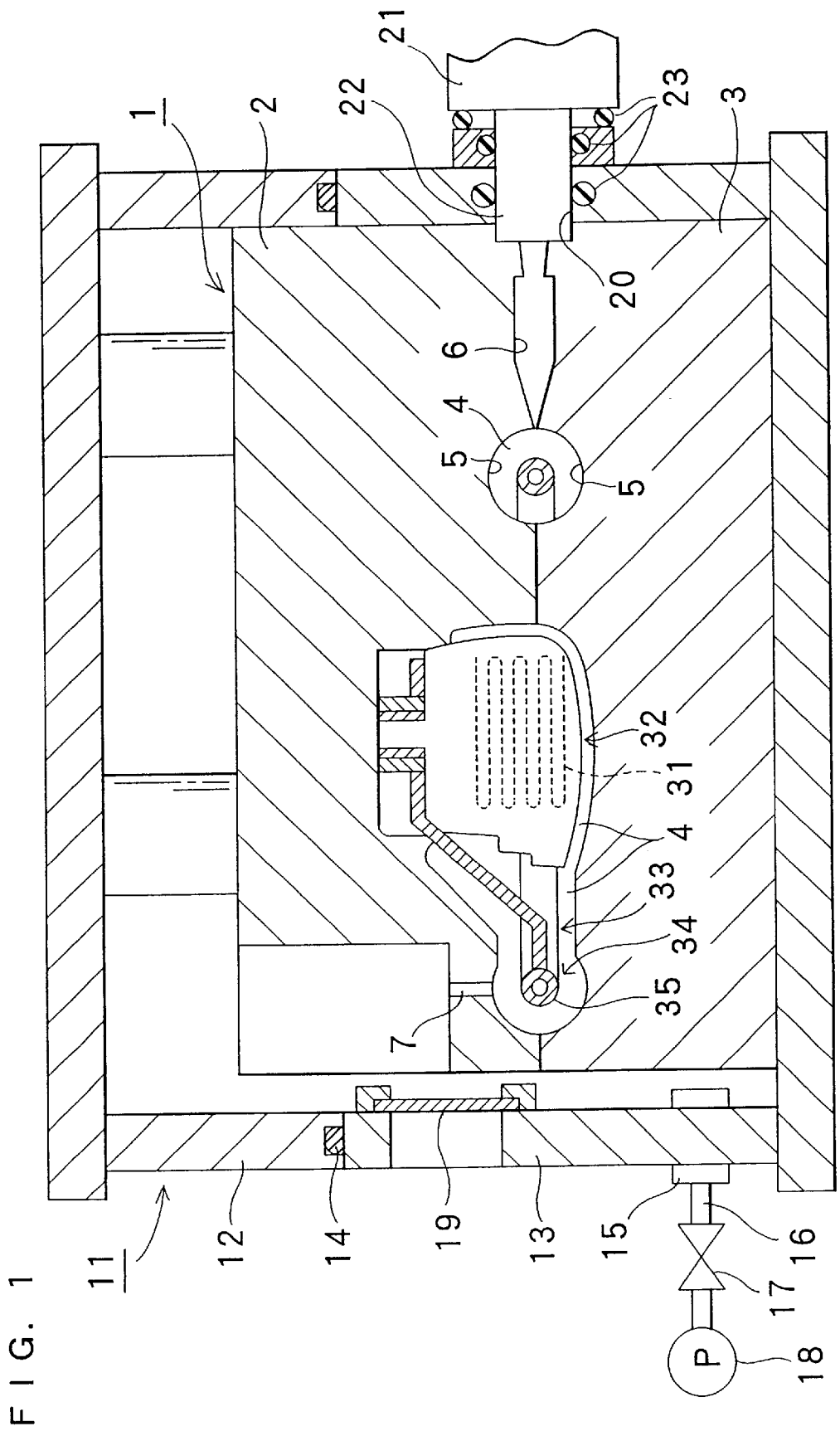
FIG. 1 is a sectional view showing a molding apparatus employed for a polyurethane for a steering wheel with an air bag according to an embodiment of this invention.

Description will now be made of the steering wheel with an air bag by processes embodying this invention with reference to FIGS. 1 to 5. FIG. 4 shows a steering wheel 30 with an air bag of the present embodiment. A pad 32 with an air bag 31, a plurality of spokes 33 and a ring 34 are integrally formed of a polyurethane 36, which shows 50 to 70 of Shore A type hardness (at a temperature of 25° C.), 150% or more of elongation at break (at a temperature of 25° C.), (and more preferably, class 4 or more of wear resistance). As indicated by double dashed lines, a groove 37 is formed on the inner surface of the polyurethane 36 of the pad 32 so the pad 32 to be broken along those lines to open at the time of inflation of the air bag 31.

Figure 2:
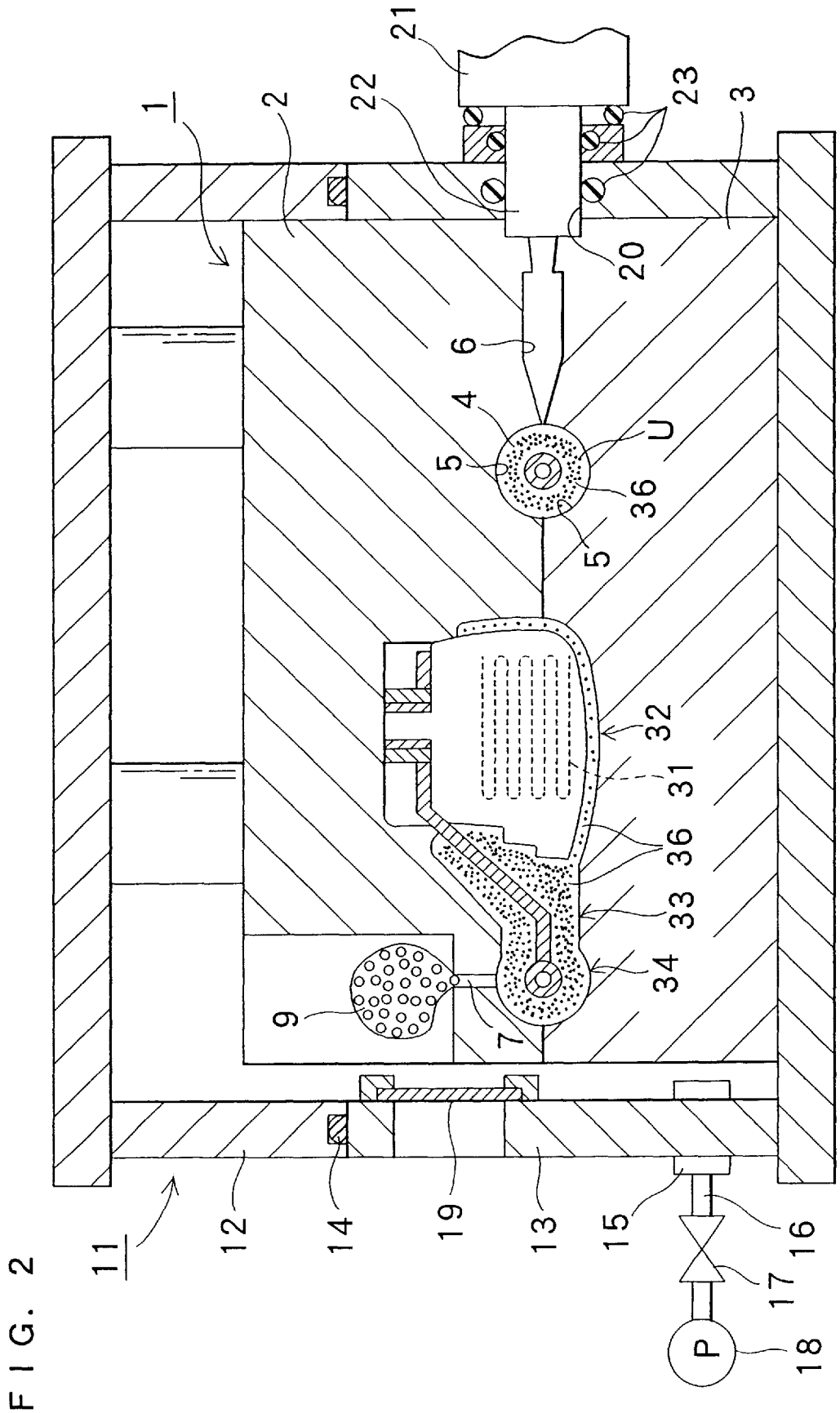
FIG. 2 is a sectional view showing the step of molding the polyurethane in the same molding apparatus.
Figure 3:
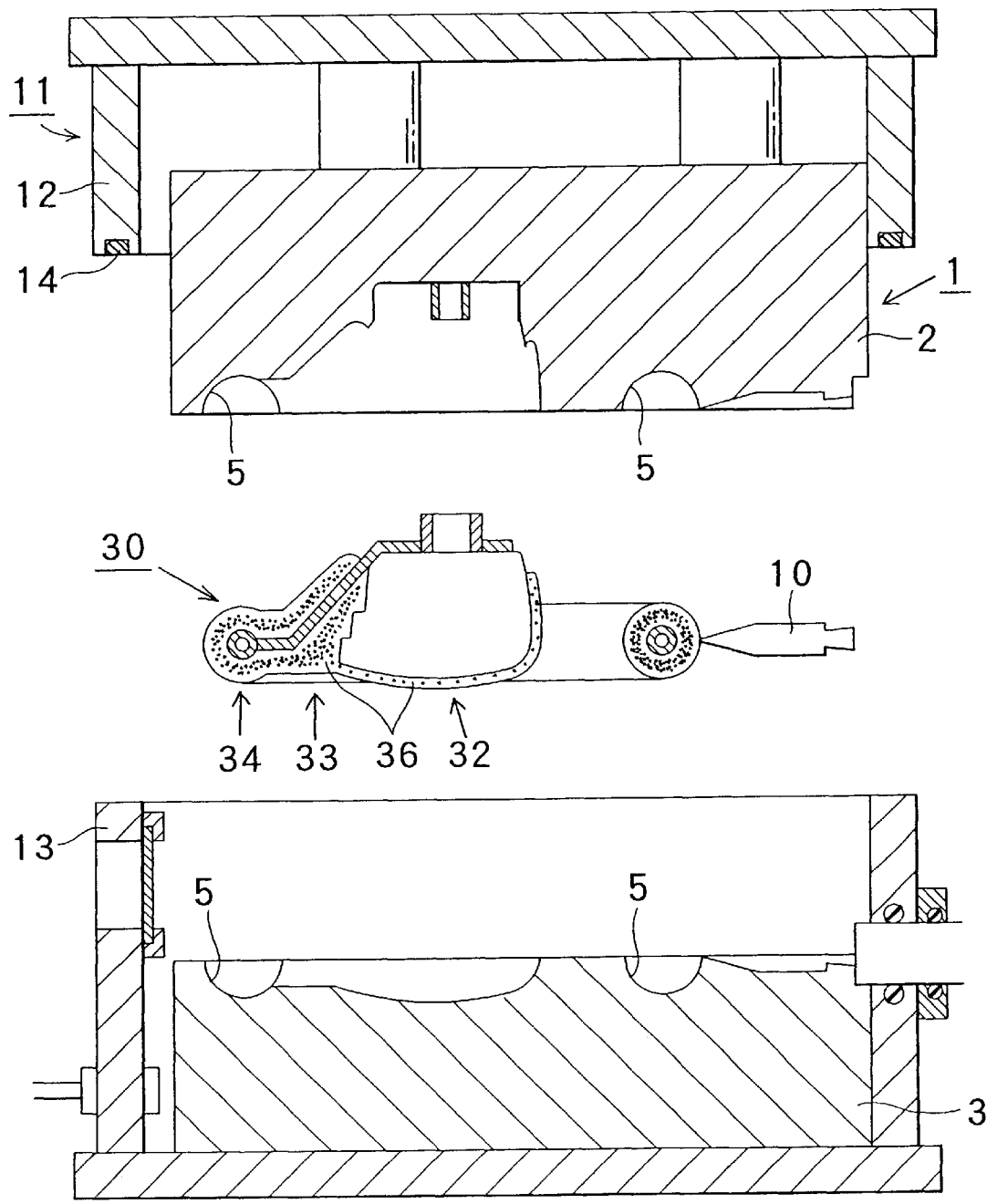
FIG. 3 is a sectional view showing the step of removing a molded product having the polyurethane from the mold.
Figure 4:
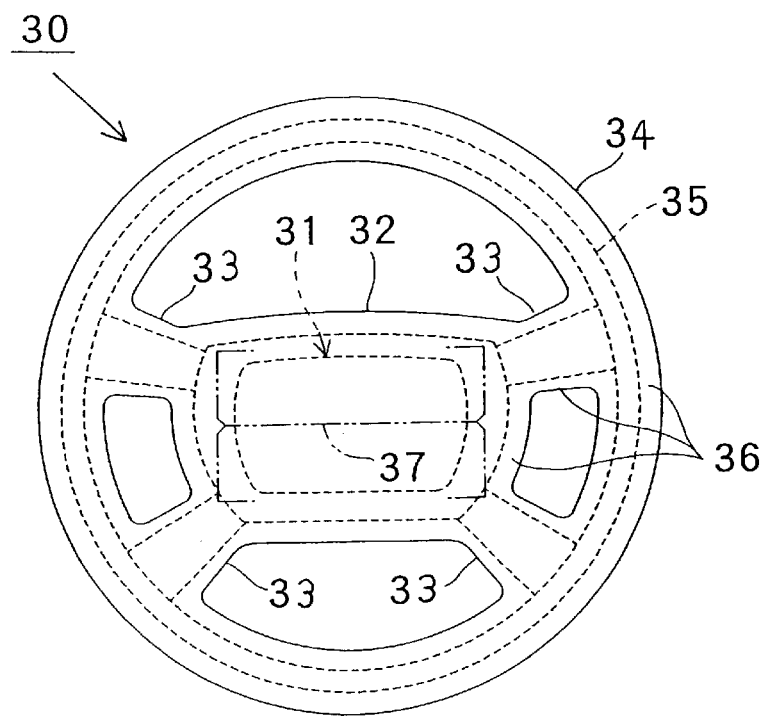
FIG. 4 is a top plan view of a steering wheel with an air bag, which has the polyurethane.

A molding apparatus employed for the polyurethane 36 includes a mold 1, a vacuum casing 11 and a material injection mechanism, as shown in FIGS. 1 to 3, and as will hereinafter be described in detail.

The mold 1 comprises an upper portion 2 and a lower portion 3 which are separate from each other. The upper and lower mold portions 2 and 3 define therebetween a cavity 4 formed by their cavity walls 5 and used for molding the polyurethane 36, and a gate 6 leading to the cavity 4 when they are joined together along a parting line. The upper mold portion 2 has a vent hole 7 formed in its final filling portion which is the last portion to be filled with a polyurethane material.

The vacuum casing 11 comprises an upper portion 12 and a lower portion 13 which are separate from each other. The upper mold portion 2 is mounted in the upper casing portion 12, and the lower mold portion 3 is supported in the lower casing portion 13. The upper and lower casing portions 12 and 13 are connected to a clamping device not shown, and the lower casing portion 13 is vertically movable to be joined with, or separated from the upper casing portion 12 to thereby join the upper and lower mold portions 2 and 3, or separate them from each other. The upper casing portion 12 has an O-ring 14 held in a groove formed in its parting surface, so that the O-ring 14 may engage the parting surface of the lower casing portion 13 to form a seal between the upper and lower casing portions 12 and 13 when the casing 11 is closed.

The lower casing portion 13 is provided with a suction plug 15 to which a vacuum pump 18 is connected through a suction hose 16 and a valve 17. The lower casing portion 13 has a gastight window 19 through which the vent hole 7 and its vicinity are visible from outside the vacuum casing 11.

The material injection mechanism includes a three-component mixing head (not shown), which can mix a polyol component, an isocyanate component and a third component. The central injection mechanism 21 ends in an injection nozzle 22, which extends through a through hole 20 formed in a wall of the lower casing portion 13, and is connected to the gate 6 in the lower mold portion 3. A plurality of O-rings 23 form a seal between the injection mechanism 21 and the through hole 20.

The process embodying this invention using the above-described molding apparatus will now be described in the order of its steps for the manufacture, by a reaction injection molding (RIM) process, of a polyurethane.

(1) The upper and lower mold portions 2 and 3 of the mold 1 are separated from each other, and a mold release agent is applied to the cavity walls 5. In case the polyurethane material U contains an appropriate amount of mold release agent, this step of applying the mold release agent can be omitted.

(2) As shown in FIG. 1, a metal core 35 for a steering wheel 30 is set in the lower mold portion 3. The metal core 35 comprises a ring and a plurality of spokes and a central boss, and the boss is equipped with the body of the pad 32 with the air bag 31. Then, the upper and lower mold portions 2 and 3 are joined together to form the cavity 4, while the upper and lower casing portions 12 and 13 are joined together to close the vacuum casing 11 tightly.

(3) The vacuum pump 18 is driven to evacuate the vacuum casing 11 to an appropriate vacuum degree to create about the same vacuum degree in the cavity 4 by drawing out air through the vent hole 7 and a clearance between parting line surfaces. As for vacuum degree within the cavity 4, 10 to 100 Torr is preferable.

(4) In the three-component mixing head, a polyol component (for instance, polyether polyol containing 12.0 parts by weight of ethylene glycol for 100 parts by weight of polyether polyol and an appropriate amount of catalyst), an isocyanate component (for instance, MDI prepolymer denaturated with a long chain glycol having an average molecular weight of 2000 or more), and a coloring agent as a third component collide and get mixed with each other to form a polyurethane material U. The polyurethane material U is discharged through the injection nozzle 22 of the injection mechanism 21, and injected through the gate 6 into the cavity 4 maintained at a reduced pressure, as shown in FIG. 2. The injected polyurethane material U in a region far from the cavity walls 5 forms a highly foamed core as a result of the bumping of naturally adsorbed gases in an environment having a reduced pressure. The material U near the cavity walls 5 forms a low foamed self-skin layer of high density by the degassing caused by the reduced pressure. The core and self-skin layer constitute the polyurethane 36. As a result, the cavity 4 is filled with all of the material U, and a small amount of the polyurethane material U at the leading ends of its streams flows out through the vent hole 7 and forms a solidified outflow 9.

(5) After the polyurethane material U has been allowed to cure, the upper and lower mold portions 2 and 3 are separated from each other, while the upper and lower casing portions 12 and 13 are separated from each other, as shown in FIG. 3, and the steering wheel 30 having the polyurethane 36 is removed from the mold. The polyurethane 36 has a gate burr 10 formed by the polyurethane material U in the gate 6, so the gate burr 10 is cut off.

EXAMPLES

In order to ascertain the effects of this invention, the above-described three-component mixing head was employed to mix and form a polyurethane material whose composition is shown in Table 1 below. The resulting material was injected into the cavity 4 of the above-described mold 1, which was under a reduced pressure of 30 Torr, and a polyurethane 36 for a steering wheel 30 was molded by RIM process. The material was also injected into a cavity of a mold (not shown) used only for samples, which was under the same reduced pressure, and a board-shaped sample (not shown) having a thickness of 5 mm was formed by RIM process. The polyol component and isocyanate component were maintained at 40° C. before got mixed.

age molecular weight of the denaturant added to the MDI prepolymer was heighten to 2000 or more, and the added amount was also increased. The ratio of a prepolymer having three benzene nucleuses to the total was 7% by weight and so low.

In Examples 2 and 3, the amount of the ethylene glycol added to the polyether polyol was increased to 12.0 parts by weight, while the average molecular weight of the denaturant added to the MDI prepolymer was heighten to 2000 or more, and the added amount was also increased. The ratios of a prepolymer having three benzene nucleuses to the total was 6% and 3% by weight, respectively, and so low.

In Examples 4 and 5, the ethylene glycol used in Example 3 was replaced with 20.5 parts by weight of diethylene glycol and 17.5 parts by weight of 1,4-butanediol, respectively.

In Table 1, polyether polyol A is a mixture of bifunctional polyether polyol having an average molecular weight of 2500 to 3500 and trifunctional polyether polyol having an average molecular weight of 4000 to 5000. Polyether polyol B is a bifunctional polyether polyol having an average molecular weight of 3000 to 5000. "DABCO 33-LV" is the tradename of SANKYO AIR PRODUCTS Co., LTD. for an amine catalyst which is a solution of triethylenediamine (33%) in dipropylene glycol. PPG (polypropylene glycol) was used as a denaturant. Prepolymer A is a prepolymer having three benzene nucleuses while prepolymer B is a

TABLE 1

|  | Comparative Example 1 | Comparative Example 2 | Example 1 | Example 2 | Example 3 | Example 4 | Example 5 |
|---|---|---|---|---|---|---|---|
| polyol component |  |  |  |  |  |  |  |
| polyether polyol A (wt part) | 100 | — | 100 | 100 | 100 | 100 | 100 |
| polyether polyol B (wt part) | — | 100 | — | — | — | — | — |
| diethylene glycol (wt part) | 18 | — | — | — | — | 20.5 | — |
| ethylene glycol (wt part) | — | 8.5 | 9.5 | 12.0 | 12.0 | — | — |
| 1,4-butanediol (wt part) | — | — | — | — | — | — | 17.5 |
| DABCO 33-LV (wt part) | 2 | 2 | 2 | 2 | 2 | 2 | 2 |
| Isocyanate component |  |  |  |  |  |  |  |
| MDI prepolymer (wt part) | 66.8 | 58.5 | 93.0 | 117.7 | 89.0 | 89.0 | 89.0 |
| (average molecular weight of denaturant) | (116) | (116) | (2900) | (3900) | (4000) | (4000) | (4000) |
| (amount of denaturant; wt %) | (5) | (8) | (40) | (42) | (25) | (25) | (25) |
| (wt % ratio of prepolymer A/prepolymer B) | (26/76) | (26/8 3) | (7/93) | (6/94) | (3/97) | (3/97) | (3/97) |
| Performance |  |  |  |  |  |  |  |
| Shore A type hardness at 25° C. | 69 ○ | 80 X | 50 ○ | 58 ○ | 63 ○ | 61 ○ | 60 ○ |
| wear resistance | class 4 ○ | class 1 X | class 1 X | class 4 ○ | class 4 ○ | class 4 ○ | class 4 ○ |
| elongation at break (%, 25° C.) | 110 X | 170 ○ | 170 ○ | 150 ○ | 240 ○ | 220 ○ | 200 ○ |
| inflation | fragment X dispersion | OK ○ | OK ○ | OK ○ | OK ○ | OK ○ | OK ○ |

In Comparative Example 1, a conventional polyurethane material for covering a ring of a steering wheel was used. In Comparative Example 2, a conventional polyurethane material for covering a pad with an air bag of a steering wheel was used. In both materials, the amount of a chain extender (diethylene glycol or ethylene glycol) added to the polyether polyol was small, while the average molecular weight of a denaturant added to the MDI prepolymer was 116 and so low, and the added amount was also small. The ratio of a prepolymer having three benzene nucleuses to the total (of a prepolymer having two benzene nucleuses and a prepolymer having three benzene nucleuses) was 26% by weight and so high.

In Example 1, the amount of the ethylene glycol added to the polyether polyol was slightly increased, while the averprepolymer having two benzene nucleuses. A prepolymer having two benzene nucleuses and a prepolymer having three benzene nucleuses of the MDI prepolymer are shown by the following chemical formula.

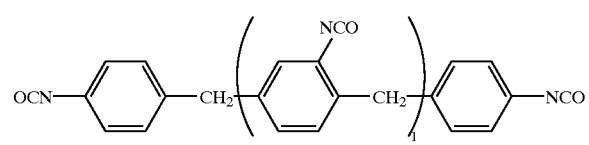

where the former is shown when 1=0, while the latter is shown when 1=1.

Hardness of the molded polyurethane 36 was measured with a Shore A type hardness tester at a temperature of 25° C.

Figure 5:
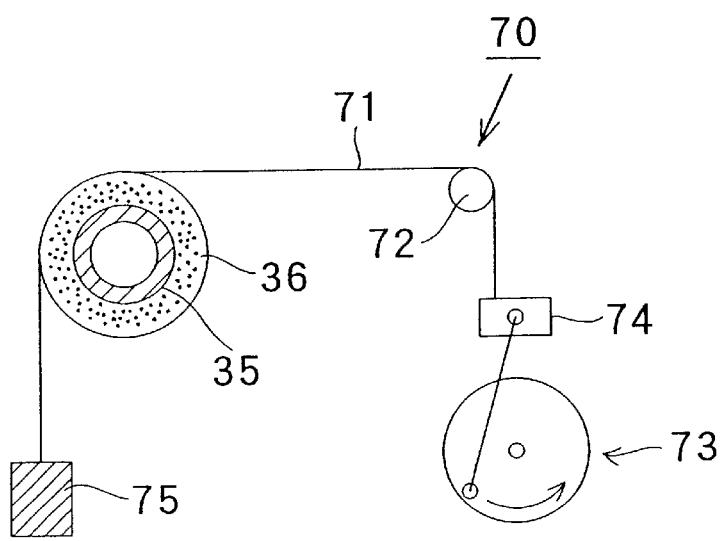
FIG. 5 is a schematic diagram showing an apparatus and a method used for wear resistance testing.

Wear resistance was evaluated by subjecting a specimen of each polyurethane 36 to 50,000 times of wear tests in a wear resistance tester 70 as shown in FIG. 5, and examined for any change in its surface. It was evaluated as class 5 (no wear could be recognized), class 4 (slight marks of wear could be recognized), class 3 (clear marks of wear could be recognized), class 2 (rather conspicuous marks of wear could be recognized), and class 1 (considerably conspicuous marks of wear could be recognized).

The wear resistance tester 70 has a cotton canvas 71 (#10 standard) conforming to the requirements of JIS L3102, extending about the polyurethane 36 and a roller 72 and having one end connected to a vertically movable member 74 driven by a crank mechanism 73, while carrying a weight 75 having a mass of 100 g at the other end thereof. The cotton canvas 71 is reciprocatable with a stroke being 10 cm for rubbing against the surface of the polyurethane 36.

Elongation at break, which was in accordance with JIS K6301, was calculated by stamping out a No. 2 dumbbell-shaped specimen from the above described board-shaped sample and measuring the tensility of the No. 2 dumbbell-shaped specimen having a thickness of 5 mm at the tensile rate of 200 mm per a minute before it broke.

Inflation was evaluated by expanding the air bag at 85° C. and examining the presence of fragmentation or dispersion of the polyurethane 36 of the pad. It was evaluated as "Fragment dispersion" when the polyurethane 36 fragmented into many small pieces and dispersed, and as "OK" when it did not (or, the fragmentation or dispersion was too few to be considered).

In these performance evaluations, "o" is shown when a required performance is satisfactorily met while "x" is shown when it is not satisfactorily met as a conclusion.

As is shown by the results, Example 1 satisfies both performances, "moderate hardness and resilience" and "high elongation at break". This is thought to be because a long chain glycol having an average molecular weight of 2000 or more was added to the MDI prepolymer as a denaturant, or in another viewpoint, the ratio of the prepolymer having three benzene nucleuses to the total was lowered to 7% by weight or less, thereby attaining a good balance between hardness and resilience, and elongation at break.

Examples 2 to 5 satisfy every performances, "moderate hardness and resilience", "high elongation at break" and "excellent wear resistance". This is thought to be because the crosslinking density was heightened by increasing the amount of the chain extender added to the polyether polyol, and a good balance between hardness and resilience, and elongation at break was attained by adding a long chain glycol having an average molecular weight of 2000 or more to the MDI prepolymer as a denaturant.

As many apparently widely different embodiments of this invention may be made without departing from the spirit and scope thereof, it is to be understood that the invention is not limited to the specific embodiments thereof except as defined in the appended claims.

What is claimed is:

1. A steering wheel comprising:

a pad positioned in a center of a ring for covering an air bag; and at least one spoke extending radially from said pad to said ring, wherein said pad, said ring and said at least one spoke are all integrally formed of a polyurethane in one molding step, said polyurethane is molded from a polyurethane material comprising a diphenylmethane diisocyanate prepolymer and a polyol component, said diphenylmethane diisocyanate prepolymer being denaturated by adding a glycol having an average molecular weight of 2000 or greater;

wherein the amount of said glycol in the denaturated diphenylmethane diisocyanate prepolymer is from about 25 to about 42% by weight based on the weight of the denaturated prepolymer;

wherein the amount of the diphenylmethane diisocynate (MDI) prepolymer is 89 to 117.7 parts by weight for 100 parts by weight of polyol component.

2. The steering wheel as set forth in claim 1, wherein said polyol component is a polyether polyol containing one selected from a group consisting of 15 to 30 parts by weight of diethylene glycol, 11 to 20 parts by weight of ethylene glycol and 12 to 25 parts by weight of 1,4-butanediol for 100 parts by weight of polyether polyol.

3. The steering wheel as set forth in claim 2, wherein said polyurethane is molded by injecting a polyurethane material into a mold cavity under reduced pressure.

4. The steering wheel set forth in claim 1, wherein said polyurethane is molded by injecting a polyurethane material into a mold cavity under reduced pressure.

5. A steering wheel comprising:

a pad positioned in a center of a ring for covering an air bag; and at least one spoke extending radially from said pad to said ring, wherein said pad, said ring and said at least one spoke are all integrally formed of a polyurethane in one molding step, said polyurethane is molded from a polyurethane material comprising a diphenylmethane diisocyanate prepolymer and a polyol component, said diphenylmethane diisocyanate prepolymer being a mixture of a prepolymer having two benzene nucleuses and a prepolymer having three benzene nucleuses, the prepolymer having three benzene nucleuses being 7% or less of the total weight of said diphenylmethane diisocyanate prepolymer;

wherein the amount of the diphenylmethane diisocynate (MDI) prepolymer is 89 to 117.7 parts by weight for 100 parts by weight of polyol component.

6. The steering wheel as set forth in claim 5, wherein said polyol component is a polyether polyol containing one selected from a group consisting of 15 to 30 parts by weight of diethylene glycol, 11 to 20 parts by weight of ethylene glycol and 12 to 25 parts by weight of 1,4-butanediol for 100 parts by weight of polyether polyol.

7. The steering wheel as set forth in claim 6, wherein said polyurethane is molded by injecting a polyurethane material into a mold cavity under reduced pressure.

8. The steering wheel as set forth in claim 5, wherein said polyurethane is molded by injecting a polyurethane material into a mold cavity under reduced pressure.

* * * * *